US009553525B2

(12) United States Patent
Huynh et al.

(10) Patent No.: US 9,553,525 B2
(45) Date of Patent: Jan. 24, 2017

(54) ACTIVE BRIDGE BACK POWERING PROTECTION AND POWERED DEVICE INTERFACE WITH ACTIVE BRIDGE CONTROL

(71) Applicant: Maxim Integrated Products, Inc., San Jose, CA (US)

(72) Inventors: Thong A. Huynh, Fremont, CA (US); Gaoling Zou, San Jose, CA (US); Andrea Vigna, Casanova Lonati (IT); Mauro Ranzato, Torre D'Isola (IT); Gianluca Mariano, San Martino Siccomario (IT)

(73) Assignee: Maxim Integrated Products, Inc., San Jose, CA (US)

( * ) Notice: Subject to any disclaimer, the term of this patent is extended or adjusted under 35 U.S.C. 154(b) by 15 days.

(21) Appl. No.: 14/033,612

(22) Filed: Sep. 23, 2013

(65) Prior Publication Data
US 2014/0085948 A1  Mar. 27, 2014

Related U.S. Application Data

(60) Provisional application No. 61/706,220, filed on Sep. 27, 2012.

(51) Int. Cl.
*H02M 7/219* (2006.01)
*H02M 7/06* (2006.01)
*H02M 1/00* (2006.01)

(52) U.S. Cl.
CPC .............. *H02M 7/06* (2013.01); *H02M 7/219* (2013.01); *H02M 2001/0009* (2013.01); *H02M 2007/2195* (2013.01); *Y02B 70/1408* (2013.01)

(58) Field of Classification Search
CPC .................... H02M 1/4225; H02M 3/33592

USPC ................ 363/89, 127, 132, 16–17, 78, 84,363/123–124
See application file for complete search history.

(56) References Cited

U.S. PATENT DOCUMENTS

| | | | |
|---|---|---|---|
| 5,690,849 A * | 11/1997 | DeVilbiss et al. | 219/497 |
| 7,500,118 B2 * | 3/2009 | Crawley et al. | 713/300 |
| 2007/0171690 A1 * | 7/2007 | Apfel | 363/127 |
| 2008/0186742 A1 * | 8/2008 | Seong | H02M 3/3376 363/17 |
| 2013/0335057 A1 * | 12/2013 | Paul | G05F 3/02 323/315 |
| 2014/0306637 A1 * | 10/2014 | Wu et al. | 318/504 |

OTHER PUBLICATIONS

Giacomini, Davide, "A novel high efficient approach to input bridges," Presented at PCIM Europe, May 27-29, 2008, Nuremberg, Germany, pp. 1-7.

* cited by examiner

Primary Examiner — Jeffrey Gblende
(74) Attorney, Agent, or Firm — Advent LLP

(57) ABSTRACT

A method is disclosed to at least partially prevent back powering of power sourcing equipment. In one or more implementations, the method includes detecting a magnitude of current through a current sensor, such as a transistor and/or a resistor. The active FET bridge is configured to rectify input power supplied by power sourcing equipment to a power over Ethernet (PoE) powered device. The method also includes causing the transistor to transition from a closed configuration to an open configuration to at least substantially prevent current flow through the transistor when the magnitude of current is below a predefined threshold to at least substantially prevent back powering of the PSE.

11 Claims, 6 Drawing Sheets

ACTIVE BRIDGE BACK POWERING PROTECTION AND POWERED DEVICE INTERFACE WITH ACTIVE BRIDGE CONTROL

CROSS-REFERENCE TO RELATED APPLICATIONS

The present application claims the benefit under 35 U.S.C. §119(e) of U.S. Provisional Application Ser. No. 61/706,220, filed Sep. 27, 2012, and titled "ACTIVE BRIDGE BACK POWERING PROTECTION AND POWERED DEVICE INTERFACE WITH ACTIVE BRIDGE CONTROL." U.S. Provisional Application Ser. No. 61/706,220 is herein incorporated by reference in its entirety.

BACKGROUND

Power over Ethernet (PoE) technology describes passing electrical power, along with data, on Ethernet cabling. POE technology is typically regulated by multiple IEEE standards. Power is supplied in common mode over two or more of the differential pairs of wires found in the Ethernet cables and comes from a power supply within a PoE-enabled networking device such as an Ethernet switch, or can be injected into a cable run with a midspan power supply. The basic elements of a PoE system are: 1) Power Sourcing Equipment (PSE), a device such as a switch that provides ("sources") power on the Ethernet cable, and 2) a powered device powered by a PSE that consumes energy from the PSE. Examples of powered devices include wireless access points, Internet Protocol (IP) telephones, and IP cameras.

SUMMARY

An active bridge system to at least partially prevent back powering of power sourcing equipment is disclosed. In an implementation, the active bridge system includes at least one field-effect transistor, at least one current sensor configured to detect a magnitude of current, and a powered device interface controller configured to turn off the at least one field-effect transistor when a current below a predetermined threshold is detected by the at least one current sensor to prevent back powering of power sourcing equipment.

In other implementations, a method to at least partially prevent back powering of power sourcing equipment is disclosed. In one or more implementations, the method includes detecting a magnitude of current through a current sensor (e.g., a transistor or a resistor). The current sensor comprises a portion of an active field-effect transistor (FET) bridge, and the active FET bridge is configured to rectify input power supplied by power sourcing equipment to a power over Ethernet (PoE) powered device. The method also includes causing the transistor(s) to transition from a closed configuration to an open configuration to at least substantially prevent current flow through the transistor when the magnitude of current is below a predefined threshold to at least substantially prevent back powering of the PSE. The transistor(s) are controlled by a powered device interface controller, which includes active bridge control circuitry.

In another implementation, a method includes detecting a magnitude of current through a single current sensing resistor that represents current through a transistor. The transistor comprises a portion of an active field-effect transistor (FET) bridge, and the active FET bridge is configured to rectify input power supplied by power sourcing equipment to a power over Ethernet (PoE) powered device. The method also includes causing the transistor to transition from a closed configuration to an open configuration to at least substantially prevent current flow through the transistor when the magnitude of current is below a predefined threshold to at least substantially prevent back powering of the PSE.

In one or more implementations, a method for controlling an active FET bridge using a powered device controller includes determining a polarity of an input voltage between a first terminal and a second terminal at an input of a bridge for a PoE powered device controller. The method also includes causing a first transistor and a second transistor to transition from an open configuration to a closed configuration when the polarity at the input of the bridge is positive and the input voltage is greater than an activation threshold (e.g., the FETs turn-on threshold) while causing a third transistor and a fourth transistor to remain in an open configuration or to transition from a closed configuration to an open configuration. The method further includes causing the third transistor and the fourth transistor to transition from an open configuration to a closed configuration when the polarity at the input of the bridge is negative and the input voltage is greater than an activation threshold (e.g., the FETs turn-on threshold) while causing the first transistor and the second transistor to remain in an open configuration or to transition from a closed configuration to an open configuration. In embodiments, the first transistor, the second transistor, the third transistor, and the fourth transistor are included in an active field-effect transistor (FET) bridge configured to rectify input power supplied by power source equipment (PSE) to a PoE powered device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

Figure 3:
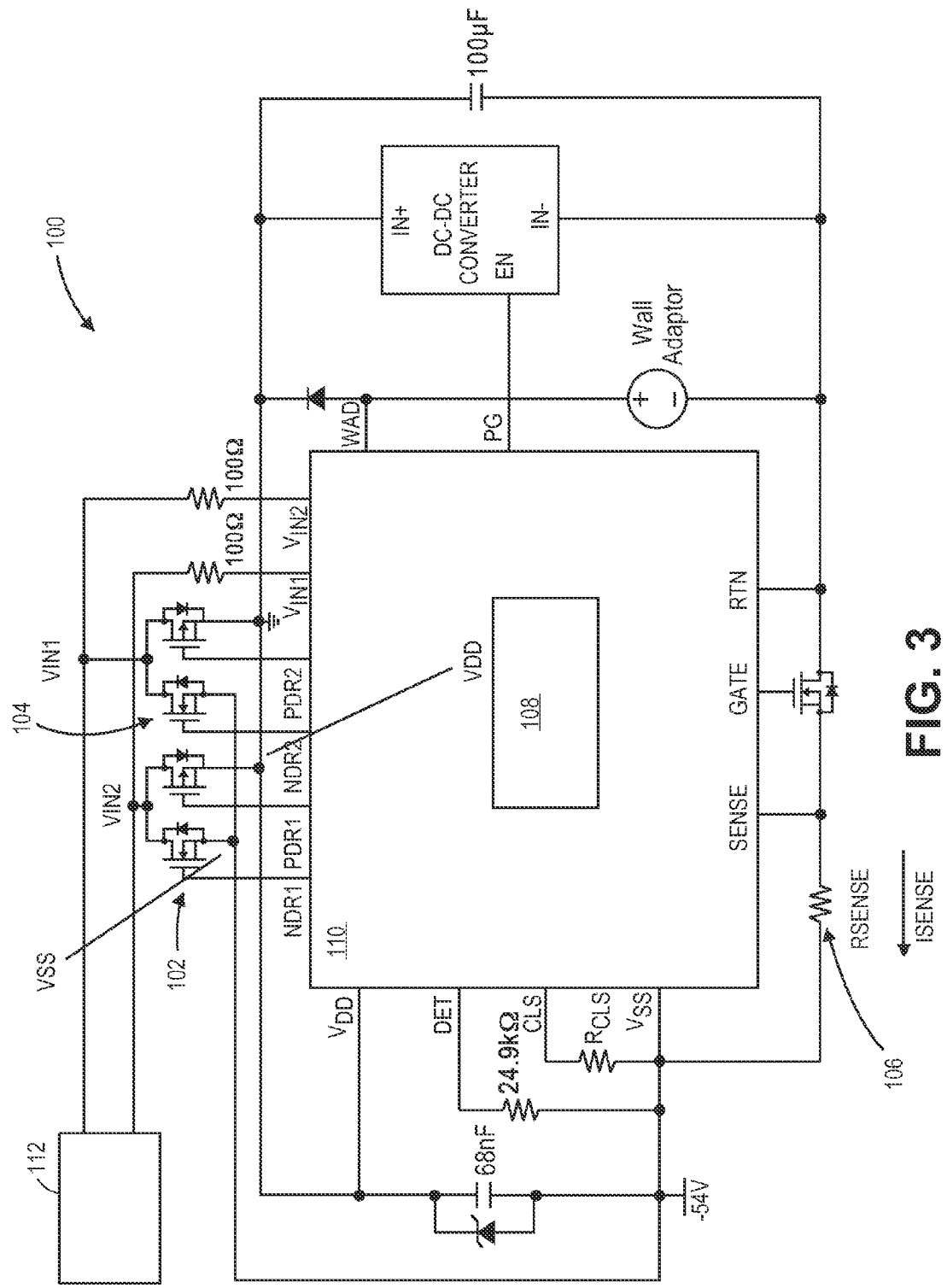

FIG. 3 is a diagrammatic illustration of a PoE powered device circuit, where the rectify bridges are implemented using active FETs, and where a driver is configured to transition a FET pair to an open configuration to at least substantially prevent current flow through the transistor when the magnitude of current is below a predefined threshold in accordance with an example implementation of the present disclosure.

Figure 4:
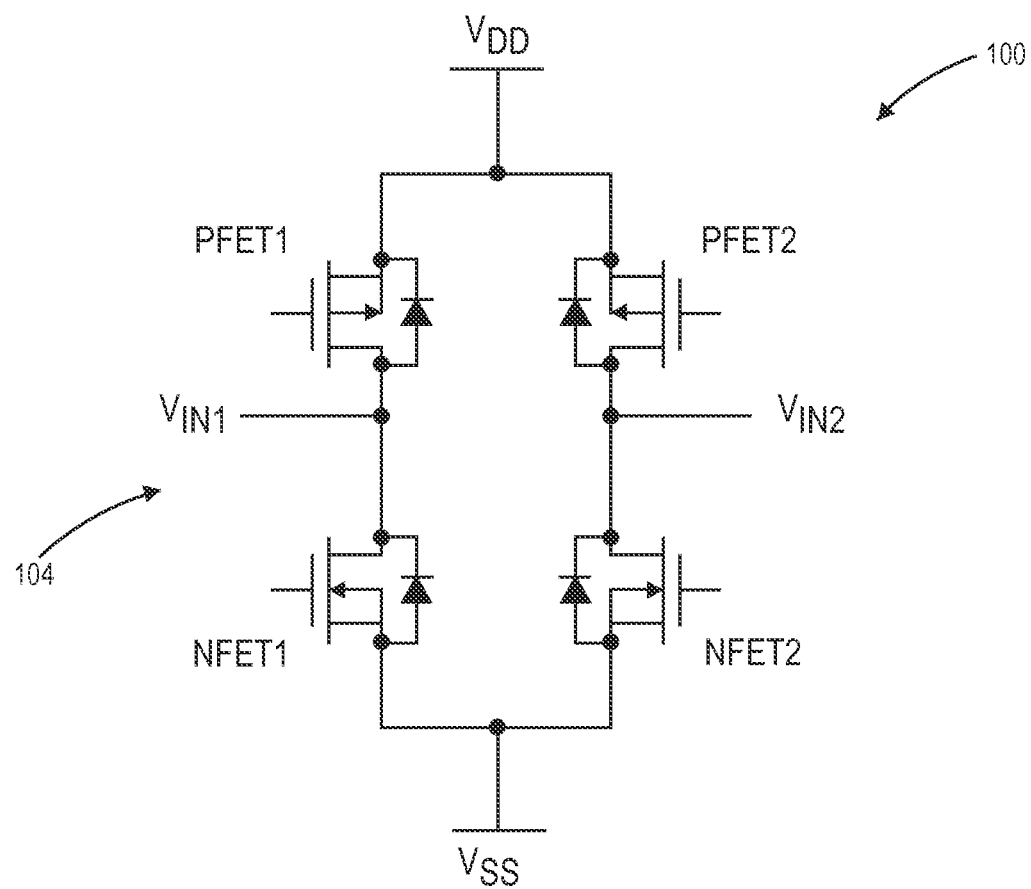

FIG. 4 is a diagrammatic illustration of rectify bridges implemented using active FETs, where a driver can be configured to transition a FET pair to an open configuration to at least substantially prevent current flow through the transistor when the magnitude of current is below a predefined threshold in accordance with an example implementation of the present disclosure.

Figure 5:
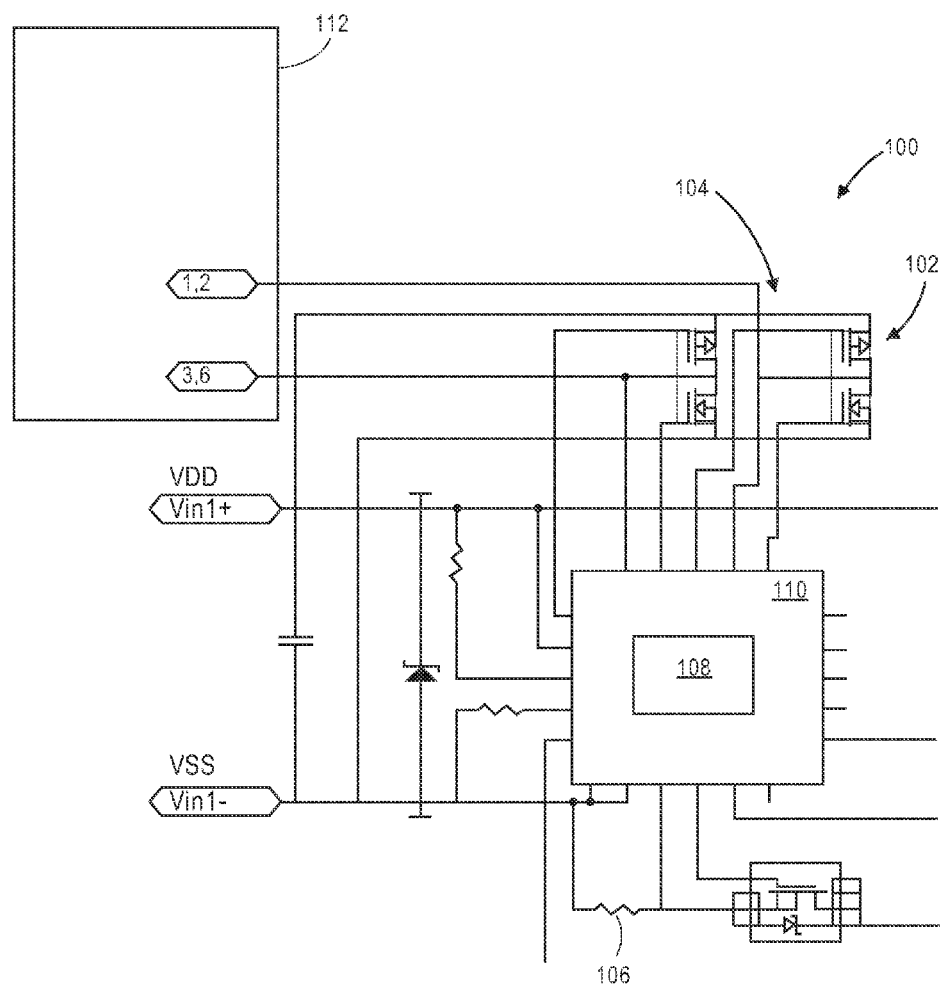

FIG. 5 is a diagrammatic illustration of a powered device controller including active FET bridge control functionality in accordance with an example implementation of the present disclosure.

Figure 6:
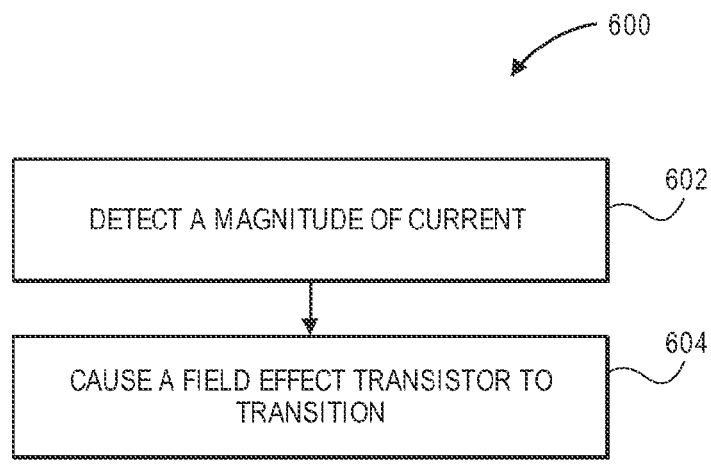

FIG. 6 is a flow diagram illustrating a process in an example implementation for preventing back powering of power sourcing equipment, such as the active bridge system shown in FIGS. 1 through 5.

Figure 7:
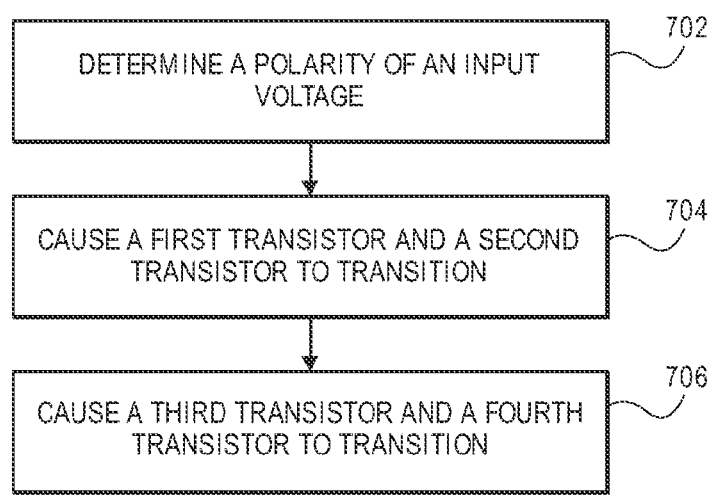

FIG. 7 is a flow diagram illustrating a process in an example implementation for preventing back powering of power sourcing equipment, such as the active bridge system shown in FIGS. 1 through 5.

DETAILED DESCRIPTION

Overview

Power over Ethernet networks are configured to provide power, as well as data, to a powered device through Ethernet cables. Ethernet cables include modular connectors that interface with the powered devices, which furnish an electrical connection between the network and the powered devices.

Figure 1:
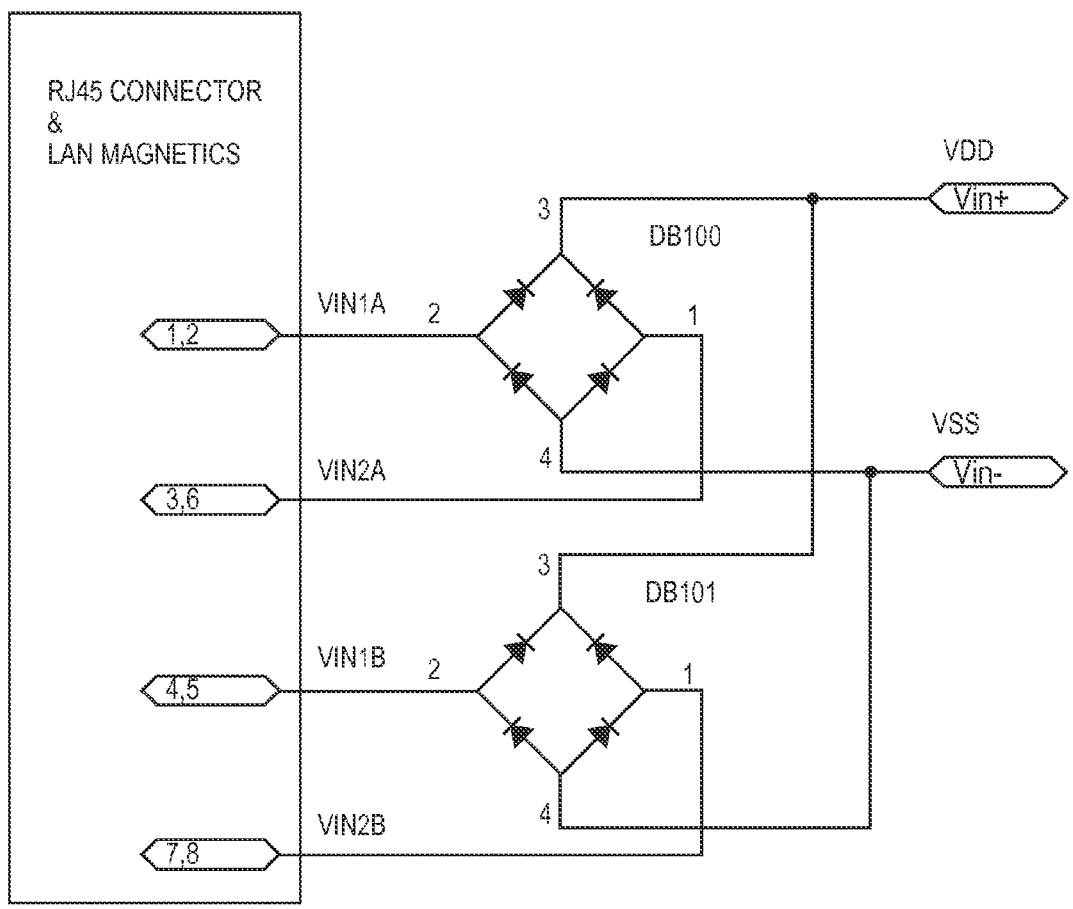
FIG. 1 is a diagrammatic illustration of two rectify bridges for a PoE powered device, where the rectify bridges are implemented using diodes.

In Power over Ethernet (PoE) systems, there are typically two rectify bridges electrically connected between a power source and a powered device controller for a Powered Device (PD) (e.g., in front of the PD). The bridges separate and rectify input power from the PSE. The PD is typically powered using either one or two PSEs from the input side of the bridges (e.g., (1.2-3.6) and/or (4.5-7.8) as illustrated in FIG. 1), and/or using a wall adapter connected to the output of the bridges (e.g., (Vin+−Vin−) as illustrated in FIG. 1). The bridge rectifier is thus used to provide the power source with the correct polarity (Vin+−Vin−), e.g., so that the PD is not damaged by incorrect supply polarities. In the accompanying figures, Vin+ is also referred to as VDD, and Vin− is also referred to as VSS.

Figure 2:
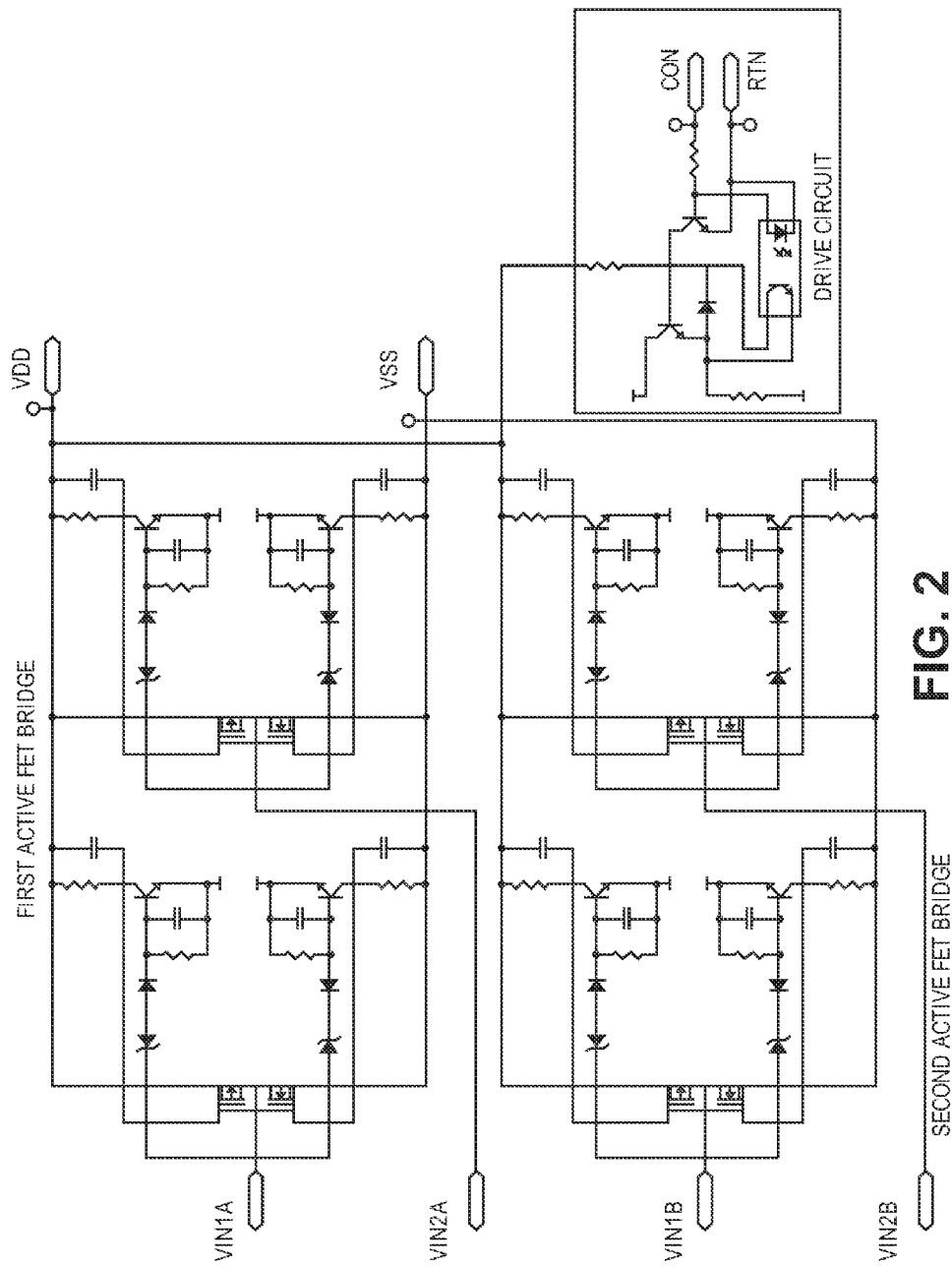
FIG. 2 is a diagrammatic illustration of two rectify bridges for a PoE powered device, where the rectify bridges are implemented using active FETs, and where a driver circuit is implemented using discrete components.

Diode bridges can be used for the rectify bridges as shown in FIG. 1. However, diode bridges can be subject to high power dissipation, e.g., due to high voltage drop across a diode. In a particular instance with negative forty-eight volt (−48V) input power, this can reduce system efficiency by about three and one-half percent (3.5%). This power reduction can be significant for high power PoE applications (e.g., Class 1 PD applications). Active FET bridges can be used to improve the efficiency of a rectify bridge, e.g., because the conduction losses of the active FETs can be lower with respect to the forward conduction losses in the diode bridge. For example, in the above scenario with negative forty-eight volt (−48V) input power, the power loss can be reduced to about one-half percent (0.5%) or less, e.g., depending upon the resistance, RDSon, of the FETs. However, active FET bridge circuits are generally subject to back powering when the bridge FETs are not driven properly (e.g., as illustrated in FIG. 2). Further, active FET configurations can require a large number of components and/or can consume a large area (e.g., of circuit board space).

Generally, an active FET bridge drive senses the input voltage polarity at the input of the bridge (e.g., coming from the PSE) to determine which active FET pair to transition to a closed configuration (e.g., turn on). However, once a FET pair is transitioned to a closed configuration, the FET pair creates a low impedance conduction path between the input and the output of the active FET bridge. In this configuration, the drive may not be able to distinguish where the power source is (i.e., when the input voltage is the same as the output voltage). Then, when a wall adapter with a higher voltage magnitude than the voltage from the PSE is connected to the powered device, back powering from the wall adapter to the PSE port can occur. Uncontrolled current back-driving a bridge can damage the FETS and/or may violate applicable PoE standards, such as a IEEE 802.3af/at standard.

Accordingly, techniques and systems are provided to separate and rectify input power supplied to a powered device by power sourcing equipment in a PoE network. Techniques of the present disclosure sense current through a FET and selectively transition between open and closed configurations (e.g., switch on/off) a FET pair. In implementations, when current through a FET pair is small and/or negative, a driver can quickly and/or securely transition to an open configuration (e.g., turn off) the FET pair, thus preventing back powering. Techniques that can be used to sense the current through a FET include, but are not necessarily limited to, techniques described in U.S. Pat. No. 6,891,425, entitled "LOW VOLTAGE OR'ING CIRCUITS AND METHODS WITH ZERO RECOVERY TIME," which is herein incorporated by reference in its entirety.

Example Implementations

Referring generally to FIGS. 3 and 4, techniques are described for at least partially preventing back powering of power sourcing equipment using an active bridge system 100. In one or more implementations, a magnitude of current through a current sensor (e.g., a field-effect transistor 102, a current sensing resistor 106, etc.) is detected. The current sensor 104 can comprise a portion of an active field-effect transistor (FET) bridge 104, where the active FET bridge 104 is configured to rectify input power supplied by power sourcing equipment to a power over Ethernet (PoE) powered device. Then, the field-effect transistor 102 can be caused to transition from a closed configuration to an open configuration to at least substantially prevent current flow through the field-effect transistor 102 when the magnitude of current is below a predefined threshold to at least substantially prevent back powering of the PSE. For example, the field-effect transistor 102 can transition to an open configuration when the current is small or negative. In this manner, active bridge system 100 back powering protection can be provided by a powered device interface controller 110, which can include active bridge control circuitry 108 (e.g., a microprocessor or other circuitry). It should be noted that in some implementations, e.g., depending upon the magnitude and polarity of current flowing through the field-effect transistor(s) 102 shown in FIG. 4, some (e.g., one or more than one) or all of the field-effect transistor(s) 102 can be transitioned to an open configuration (e.g., turned off) to prevent ($V_{DD}$−$V_{SS}$) from back powering $V_{IN1}$ and $V_{IN2}$.

In another implementation, a magnitude of current through a current sensing resistor 106 is detected. This current represents the current through a transistor. The field-effect transistor(s) 102 comprises a portion of an active field-effect transistor (FET) bridge 104, where the active FET bridge 104 is configured to rectify input power supplied by power sourcing equipment to a power over Ethernet (PoE) powered device. Then, the field-effect transistor(s) 102 are caused to transition from a closed configuration to an open configuration to at least substantially prevent current flow through the field-effect transistor(s) 102 when the magnitude of current is below a predefined threshold to at least substantially prevent back powering of the PSE. For example, the field-effect transistor(s) 102 can transition to an open configuration when the current is small or negative. In this manner, active FET bridge 104 back powering protection can be provided by a powered device interface controller 110. It should be noted that in some implementations, e.g., depending upon the magnitude and polarity of current flowing through the current sensing resistor 106 RSENSE shown in FIG. 3, some (e.g., one or more than one) or all of the field-effect transistor(s) 102 can be transitioned to an open configuration (e.g., turned off) to prevent (VDD–VSS) from back powering $V_{IN1}$ and $V_{IN2}$.

Referring generally to FIGS. 3 through 5, active FET bridge 104 control functionality can be included in a powered device interface 110 controller for a PoE network (e.g., as illustrated in FIG. 5). By determining (e.g., detecting) the polarity of an input voltage between a first terminal and a second terminal at a PoE powered interface device controller 110 (e.g., the input PoE port voltage), the powered interface device controller 110 can be configured to control the active FET bridge 104. For example, the powered interface device controller 110 can determine which side of the rectifier bridge 104 is active and drive the gates of the active field-effect transistor(s) 102 accordingly. With reference to FIG. 4, depending on the polarity of $V_{IN1}$ and $V_{IN2}$, the powered device interface controller 110 and/or active bridge control circuitry 108 can turn on the corresponding path (e.g., causing a first transistor, such as PFET 1 and/or NFET1, and a second transistor, such as PFET2 and/or NFET2, to transition from an open configuration to a closed configuration (while causing a third transistor and a fourth transistor to remain in an open configuration or to transition from a closed configuration to an open configuration) or causing the third transistor and the fourth transistor to transition from an open configuration to a closed configuration (while causing a first transistor and a second transistor to remain in an open configuration or to transition from a closed configuration to an open configuration)) to provide the correct polarity for the powered devices.

In implementations, the field-effect transistor(s) 102 can be transitioned to a closed configuration based upon a voltage difference between a first and a second terminal. For example, if a first voltage difference (e.g., $V_{IN1}-V_{IN2}$) is greater than an activation threshold (e.g., a turn-on-threshold), then PFET1 and NFET 2 are transitioned to a closed configuration (e.g., turned on). If a second voltage difference (e.g., $V_{IN2}-V_{IN1}$) is greater than an activation threshold (e.g., the turn-on-threshold as previously described), then PFET2 and NFET1 are transitioned to a closed configuration (e.g., turned on). In some embodiments, using a powered device controller configured in this manner can reduce the number of external components for an active FET bridge from about thirty-six (36) to about two (2), while reducing printed circuit board (PCB) space from about five hundred thousand millimeters squared (500,000 mm$^2$) to about thirty-two thousand millimeters squared (32,000 mm$^2$). However, these ranges are provided by way of example only and are not meant to be restrictive of the present disclosure. Thus, in other implementations, more or fewer external components can be used, and the components can occupy varying amounts of space on a PCB.

Example Methods

FIG. 6 illustrates an example process 600 that employs an active bridge system to at least partially prevent back powering of power sourcing equipment, such as the active bridge system 100 shown in FIG. 1. As illustrated in FIG. 6, a magnitude of current through a current sensor is detected (Block 602) and at least one field-effect transistor is caused to transition from a closed configuration to an open configuration (Block 604).

FIG. 7 illustrates an example process 700 that employs an active bridge system to at least partially prevent back powering of power sourcing equipment, such as the active bridge system 100 shown in FIG. 1. As illustrated in FIG. 7, a polarity of an input voltage between a first terminal and a second terminal at an input of a bridge is determined for a power over Ethernet (PoE) powered device controller (Block 702), a first transistor and a second transistor is caused to transition from an open configuration to a closed configuration when the polarity at the input of the bridge is positive (Block 704), and the third transistor and the fourth transistor is caused to transition from an open configuration to a closed configuration when the polarity at the input of the bridge is negative (Block 706).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An active bridge system, comprising:
   at least one field-effect transistor comprising a portion of an active field-effect bridge, the at least one field-effect transistor configured to detect a magnitude of current;
   active bridge control circuitry integrated within a powered device interface controller, the active bridge control circuitry operatively connected to the at least one field-effect transistor, the active bridge control circuitry configured to turn off the at least one field-effect transistor when a negative current is detected by the at least one field-effect transistor to prevent back powering of power sourcing equipment,
   where the active bridge field-effect bridge is configured to rectify input power supplied by power sourcing equipment to a Power over Ethernet powered device.

2. The active bridge system of claim 1, wherein the at least one field-effect transistor comprises an n-type field-effect transistor.

3. The active bridge system of claim 1, wherein the at least one field-effect transistor comprises a p-type field-effect transistor.

4. The active bridge system of claim 1, wherein the active bridge system is located before the Power over Ethernet powered device.

5. The active bridge system of claim 1, wherein the Power over Ethernet powered device includes an RJ45 connector.

6. A method comprising:
   detecting a magnitude of current through at least one field-effect transistor comprising a portion of an active field-effect bridge; and
   causing the at least one field-effect transistor to transition from a closed configuration to an open configuration to at least substantially prevent current flow through the at least one field-effect transistor with active bridge control circuitry integrated within a powered device interface controller when the magnitude of current is negative to at least substantially prevent back powering of power sourcing equipment, wherein the active field-effect bridge is configured to rectify input power supplied by the power sourcing equipment to a Power over Ethernet powered device, wherein the at least one field-effect transistor is directly connected to the power sourcing equipment.

7. The method of claim 6, wherein causing the at least one field-effect transistor to transition from the closed configuration to the open configuration comprises causing at least one n-type field effect transistor to transition.

8. The method of claim 6, wherein causing the at least one field-effect transistor to transition from the closed configuration to the open configuration comprises causing at least one p-type field effect transistor to transition.

9. The method of claim 6, wherein the active bridge system comprises is located before the Power over Ethernet device.

10. The method of claim 6, wherein the Power over Ethernet powered device includes an RJ45 connector.

11. A method comprising:
   determining a polarity of an input voltage between a first terminal and a second terminal at an input of an active field-effect bridge for a power over Ethernet (PoE) powered device controller, where the polarity is determined using a powered device interface controller;
   causing, by way of active bridge control circuitry integrated within the powered device interface controller, a first transistor and a second transistor to transition from an open configuration to a closed configuration when the polarity at the input of the active field-effect bridge is positive and the input voltage is greater than an activation threshold while causing a third transistor and a fourth transistor to at least one of remain in an open configuration or transition from a closed configuration to an open configuration; and
   causing the third transistor and the fourth transistor, by way of the active bridge control circuitry integrated within the powered device interface controller, to transition from an open configuration to a closed configuration when the polarity at the input of the active field-effect bridge is negative and the input voltage is greater than an activation threshold while causing the first transistor and the second transistor to at least one of remain in an open configuration or transition from a closed configuration to an open configuration to prevent back powering of power sourcing equipment,
   wherein the first transistor, the second transistor, the third transistor, and the fourth transistor are included in the active field-effect transistor (FET) bridge, the active FET bridge configured to rectify input power supplied by power source equipment (PSE) to a PoE powered device, the powered device interface controller operatively connected to the active field-effect transistor bridge, wherein the active FET bridge is directly connected to the power sourcing equipment.

* * * * *